(12) United States Patent
Mitra

(10) Patent No.: US 10,025,108 B2
(45) Date of Patent: Jul. 17, 2018

(54) DEVICE FOR HOMOGENIZING LASER RADIATION

(71) Applicant: LIMO Patentverwaltung GmbH & Co.KG, Dortmund (DE)

(72) Inventor: Thomas Mitra, Dortmund (DE)

(73) Assignee: LIMO PATENTVERWALTUNG GmbH & Co. KG, Dortmund (DE)

( * ) Notice: Subject to any disclaimer, the term of this patent is extended or adjusted under 35 U.S.C. 154(b) by 0 days.

(21) Appl. No.: 14/773,458

(22) PCT Filed: Mar. 4, 2014

(86) PCT No.: PCT/EP2014/054164
§ 371 (c)(1),
(2) Date: Sep. 8, 2015

(87) PCT Pub. No.: WO2014/139835
PCT Pub. Date: Sep. 18, 2014

(65) Prior Publication Data
US 2016/0011426 A1    Jan. 14, 2016

(30) Foreign Application Priority Data
Mar. 13, 2013  (DE) .................. 10 2013 102 553

(51) Int. Cl.
*G02B 27/12*  (2006.01)
*G02B 27/09*  (2006.01)

(52) U.S. Cl.
CPC ....... *G02B 27/123* (2013.01); *G02B 27/0927* (2013.01); *G02B 27/0961* (2013.01); *G02B 27/0966* (2013.01)

(58) Field of Classification Search
CPC .............. G02B 27/0927; G02B 27/123; G02B 27/0966; G02B 27/0961
(Continued)

(56) References Cited

U.S. PATENT DOCUMENTS

| 5,887,096 A | 3/1999 | Du et al. |
| 6,548,781 B1 | 4/2003 | Brunwinkel |

(Continued)

FOREIGN PATENT DOCUMENTS

| CN | 1168745 A | 12/1997 |
| CN | 1947053 A | 4/2007 |

(Continued)

OTHER PUBLICATIONS

Reinhard Voelkel et al.: "Laser Beam Homogenizing: Limitations and Constraints", Proceedings of SPIE, Bd. 7102 (Sep. 19, 2008)(12 pages).

(Continued)

*Primary Examiner* — Euncha Cherry
(74) *Attorney, Agent, or Firm* — Cohen & Hildebrand, PLLC

(57) ABSTRACT

The assembly to homogenize a light beam, especially from an excimer laser, has at least two optical functional surfaces (26) in succession along the light path (z). Two groups of refractive or diffractive imaging elements are at the optical surfaces as cylinder lenses (30, 30', 32), with at least two imaging elements of different characteristics within at least one of the groups. The light beam is finally carried through a Fourier lens (28) to the working plane (29).

11 Claims, 2 Drawing Sheets

(58) Field of Classification Search
USPC .............................. 359/619–624, 626, 628
See application file for complete search history.

(56) References Cited

U.S. PATENT DOCUMENTS

| | | | |
|---|---|---|---|
| 6,567,219 B1 | 5/2003 | Tanaka | |
| 2002/0021497 A1 | 2/2002 | McCulloch et al. | |
| 2002/0041444 A1 | 4/2002 | Kahlert et al. | |
| 2006/0109443 A1 | 5/2006 | Toyoda | |
| 2006/0209310 A1 | 9/2006 | Muenz et al. | |
| 2007/0127131 A1 | 6/2007 | Lissotschenko et al. | |
| 2010/0033829 A1* | 2/2010 | Wippermann ......... | G02B 27/01 359/623 |
| 2012/0057345 A1 | 3/2012 | Kuchibhotla | |
| 2012/0127723 A1 | 5/2012 | Mikhailov | |

FOREIGN PATENT DOCUMENTS

| | | |
|---|---|---|
| DE | 103 27 733 | 3/2005 |
| DE | 10 2009 021251 | 11/2010 |
| EP | 1548803 | 6/2005 |
| JP | 2000323428 A | 11/2000 |
| JP | 2003131165 A | 5/2003 |
| JP | 2004045885 A | 2/2004 |
| JP | 2006309207 A | 11/2006 |
| JP | 2007114741 A | 5/2007 |
| JP | 2007133367 A | 5/2007 |
| JP | 2008524662 A | 7/2008 |
| JP | 2011091177 A | 5/2011 |
| JP | 2012527002 A | 11/2012 |
| WO | 2008087012 | 7/2008 |
| WO | 2011048877 | 4/2011 |

OTHER PUBLICATIONS

International Search Report of counterpart PCT/EP2014/054164 dated Apr. 29, 2014 (13 pages).

German Office Action of counterpart application DE 10 2013 102 553.6 dated Nov. 27, 2013 (5 pages).

* cited by examiner

DEVICE FOR HOMOGENIZING LASER RADIATION

This is an application filed under 35 U.S.C. § 371 of PCT/EP2014/054164 filed on Mar. 4, 2014 claiming priority to DE 10 2013 102 553.6 filed on Mar. 13, 2013.

BACKGROUND OF THE INVENTION

The present invention relates to a device for homogenizing laser radiation, with
a first lens array having a first optically functional boundary surface through which the laser radiation can enter into the first lens array, and a second optically functional boundary surface through which the laser radiation can exit from the first lens array, wherein at least one of the two optically functional boundary surfaces has a plurality of lens means, which are configured to split the laser beam into a plurality of sub-beams, and a second lens array arranged in the beam path behind the first lens array, with a first optically functional boundary surface through which the sub-beams can enter into the second lens array, and with a second optically functional boundary surface through which the sub-beams can exit from the second lens array, wherein at least one of the two optically functional boundary surfaces includes a plurality of lens means capable of refracting the sub-beams.

Definitions

As the propagation direction of the laser radiation, the average propagation direction of the laser radiation is indicated, in particular when it is not a plane wave or at least partially divergent. The term laser, light beam, sub-beam or beam does not, unless expressly stated otherwise, refer to an idealized beam of the geometrical optics, but to a real light beam, such as for example a laser beam with a Gaussian profile or a modified Gaussian profile or a top hat profile, which does not have an infinitesimally small, but rather an extended beam cross-section.

Various embodiments of devices of the aforementioned type for homogenizing laser radiation are known in the art. They serve the purpose to create in a working plane in at least one direction a very homogeneous (uniform) distribution of the intensity of the laser radiation, as is required for many applications, such as for applications related to materials processing.

Imaging devices for homogenizing laser radiation are designed in two stages and include a first lens array forming a first homogenization stage, with a plurality of lens means, in particular cylindrical lens means, on a first optically functional boundary surface and/or on a second optically functional boundary surface. Furthermore, such devices include a second lens array forming a second homogenization stage and arranged in the propagation direction of the laser beam behind the first lens array and having on a first optically functional boundary surface and/or a second optically functional boundary surface a plurality of lens means, in particular cylindrical lens means. Moreover, such devices for homogenizing light often include a Fourier lens arranged in the beam propagation direction behind the second lens array, which is usually formed as a spherical lens and is arranged in the beam propagation direction behind the second lens array. The lens means of the first lens array are capable of splitting a collimated laser beam incident on the first lens array into a plurality of sub-beams. The second lens array, in combination with the Fourier lens, is capable of superimposing the sub-beams in the working plane so that a homogeneous (uniform) intensity distribution can be obtained in the working plane in at least one direction. The function of the Fourier lens may advantageously also be incorporated in the second lens array so as to produce a homogeneous intensity distribution in a working plane. The cross-sectional profiles of the cylindrical lens means of the first lens array are shaped spherically transversely to their respective cylinder axes and can therefore be mathematically described in simple terms by a single radius (radius of curvature). Furthermore, the cross-sectional profiles of the cylindrical lens means of the second lens array are also spherically shaped transversely to their respective cylinder axes.

Conventional devices for homogenizing laser radiation have a disadvantage in that the energy density (or intensity) of the sub-beams on the individual lens means of the second lens array can be very high and thus exceed the damage threshold of the optionally applied antireflection coating, which may damage the antireflection coating.

BRIEF SUMMARY OF THE INVENTION

It is the object of the present invention to provide a device for homogenizing laser radiation of the aforementioned type, which is able to reduce the energy density of the sub-beams incident on the lens means of the second lens array.

This object is attained with a device for homogenizing laser radiation of the aforementioned type having the features of the characterizing part of claim 1. The dependent claims relate to advantageous embodiments of the invention.

A device according to the present invention for homogenizing laser radiation is characterized in that the lens means of the first lens arrays are formed so as to split the laser radiation into a plurality of sub-beams and to shape the sub-beams in such a way so that the sub-beams can illuminate the lens means of the second lens array essentially homogeneously. This approach exploits the fact that the first lens array of the two-stage (and thus imaging) device for homogenizing laser beams is essentially designed to not overexpose the lens means of the second lens array and thus subject them to an increased intensity. The lens means of the second lens array, at which the sub-beams are refracted, thus primarily determine the homogeneity of laser radiation in the working plane. With the device for homogenizing laser beams according to the invention, the energy density (or intensity) of the sub-beams on the individual lens means of the second lens array can advantageously be reduced such as to always remain below the damage threshold of the optionally applied antireflection coating, thus effectively preventing damage to this antireflection coating. Furthermore, aging effects due to exposure of the antireflection coating to electromagnetic radiation in the ultraviolet spectral region, can be reduced in a particularly advantageous manner. A homogeneous angular distribution of the sub-beams is obtained after passing through the second lens array, which results in a substantially homogeneous intensity distribution in the optical far-field in a working plane that is sufficiently remote from the second lens array.

In a preferred embodiment, it is proposed that at least some of the lens means of the first lens array are shaped aspherical or acylindrical. With this measure, the illumination conditions provided in accordance with claim 1 for the second lens array can be realized in a surprisingly simple manner. In a particularly preferred embodiment, all of the lens means of the first lens array may be shaped aspherical or acylindrical. In this way, the first lens array can be produced in a particularly simple manner, since all of the lens means of the first lens array have (preferably identical) aspherical or acylindrical cross-sectional profiles. Conversely, the lens means of the second lens array have preferably a spherical cross-sectional profile.

In a preferred embodiment, it is proposed that the lens means of the first lens array have a focal length $f_1$ and the lens means of the second lens array have a focal length $f_2$, wherein the focal lengths are selected such that $f_1 = f_2$.

In a particularly preferred embodiment, the lens means of the first lens array may have a focal length $f_1$ and the lens means of the second lens array may have a focal length $f_2$, wherein the focal lengths are selected such that $f_1 > f_2$.

In a further particularly preferred embodiment, the lens means of the first lens array may have a focal length $f_1$ and the lens means of the second lens array may have a focal length $f_2$, wherein the focal lengths are selected such that $f_1 < f_2$.

It has been found that different focal lengths $f_1$, $f_2$ of the first and second lens arrays can advantageously improve the uniform illumination of the lens means of the second lens array.

In a particularly advantageous embodiment, the first lens array and the second lens array may be arranged at a distance d from each other, wherein the distance d is selected so that $d = f_2$, This is, strictly speaking, true only when the lens vertex of the lens means of the first lens array point exactly to the lens apexes of their associated lens means of the second lens array. Otherwise, the distance d would need to be corrected by T/n (T: lens thickness, n: refractive index). This length dimension must be subtracted from $d = f_2$ in each case, when a vertex of one of the lens means of the first lens array points away from its associated lens means of the second lens array.

Preferably, the lens means of the first lens array and/or of the second lens array may be embodied as a microlens means.

In a particularly preferred embodiment, it is proposed that the device includes a Fourier lens means which is designed and arranged in the beam path behind the second lens array in such a way that it can superimpose the sub-beams refracted by the lens means of the second lens array in a working plane. In this way, a homogeneous intensity distribution can be obtained in a working plane in the optical near-field in the beam propagation direction behind the second lens array.

In an alternative embodiment, the second lens array may be designed and configured to superimpose the sub-beams refracted by its lens means in a working plane. In this variant, the Fourier lens function is advantageously integrated in the second lens array.

In a particularly advantageous embodiment, it is proposed that the lens means of the first lens array are designed as cylindrical lens means, with their cylinder axes extending parallel to each other in a first direction, which are adapted to split the laser beam into a plurality of sub-beams, and/or the lens means of the second lens arrays are designed as cylindrical lens means, with their cylinder axes extending parallel to each other in a first direction, which can refract the sub-beams.

A particularly high beam quality can thus be obtained in the working plane.

In a particularly advantageous embodiment, at least some of the cylindrical lens means of the first lens array, preferably all cylindrical lens means the first lens array, may have an aspheric cross-sectional profile when viewed transversely to their respective cylinder axes.

In in a preferred embodiment, the cross-sectional profiles of at least some of the cylindrical lens means of the first lens array (preferably all cylindrical lens means of the first lens array) may be symmetric with respect to a plane of symmetry extending orthogonal to the cylinder axis of the respective cylindrical lens means. According to another embodiment, the cross-sectional profiles of at least some of the cylindrical lens means of the first lens array may be shaped asymmetrical.

With the device for homogenizing the laser radiation disclosed herein, wherein the cross-sectional profiles of the lens means of the first lens array are shaped aspherical or acylindrical, the maximum intensity incident on the second lens array can be reduced to about 50% of the original maximum intensity. In particular, damage to the antireflection coating can thereby be effectively prevented. Furthermore, aging effects that can occur when exposing the antireflection coating to electromagnetic radiation in the ultraviolet region can be effectively minimized.

The use of the above device for homogenizing laser radiation may under certain circumstances affect the homogeneity and/or the edge steepness of the intensity distribution in the working plane, which may be acceptable depending on the application. If necessary, a correction can be performed by an appropriate adjustment of the second lens array.

BRIEF DESCRIPTION OF THE DRAWINGS

Further features and advantages of the present invention will become apparent from the following description of preferred embodiments with reference to the accompanying drawings, which show in.

DETAILED DESCRIPTION OF THE INVENTION

Figure 1:
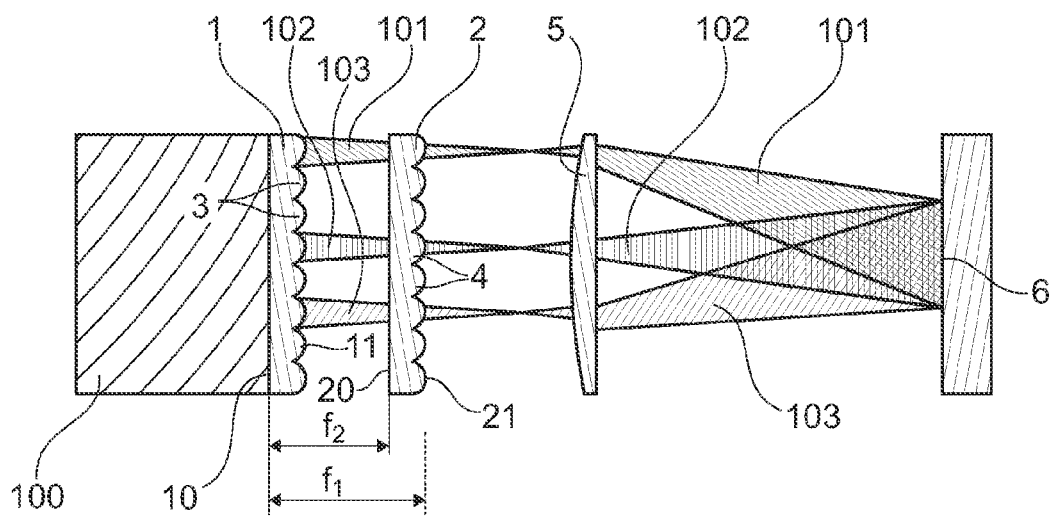
FIG. 1 a schematically simplified side view of a device for homogenizing light, which is designed according to a preferred exemplary embodiment of the present invention, and FIG. 2 a schematic diagram of an aspherical cross-sectional profile of a cylindrical lens means of a first lens array of the device of FIG. 1.

A device for homogenizing laser radiation 100 implemented according to a preferred exemplary embodiment of the present invention will now be explained in more detail below with reference to FIG. 1. To simplify the further explanations, a Cartesian coordinate system is shown in FIG. 1, which defines the y-direction and the orthogonal z-direction orthogonal thereto, which in this case is the propagation direction of the laser radiation 100. The x-direction of the Cartesian coordinate system thus extends into the plane.

The device for homogenizing laser radiation 100 is designed in two stages and has a first lens array 1 with a first optically functional boundary surface 10, which is in this case planar, and a second optically functional boundary surface 11 having a plurality of cylindrical lens means 3 juxtaposed in the y direction, whose cylinder axes are parallel to each other and extend in the x direction (and thus in the drawing plane). The first lens array 1 is thus plano-convex. The first optically functional boundary surface 10 of the first lens array 1 may have an antireflection coating to prevent reflection losses during use and to improve the transmission of the laser radiation 100 through the first lens array 1. Moreover, the second optically functional boundary surface 11 of the first lens array 1 may also have an antireflection coating.

In the beam propagation direction (z-direction), a second lens array 2 with a first optically functional boundary surface 20 is arranged behind the first lens array 1, wherein the first optically functional boundary surface 20 is also planar and forms a light entrance surface, and a second optically functional boundary surface 21 forming a light exit surface and including a plurality of cylindrical lens means 4 juxtaposed in the y direction. The cylinder axes of the cylindrical lens means 4 extend again parallel to one another in the x direction and thus into the drawing plane. The second lens array 21 is thus also formed planoconvex. The first optically functional boundary surface 20 of the second lens array 2 may preferably have an antireflection coating to reduce reflection losses and to thereby improve the transmission of the laser radiation 100 through the second lens array 2. Alternatively or in addition, the second optically functional boundary surface 21 of the first lens array 2 may also have an antireflection coating.

The cylindrical lens means 3, 4 of the first lens array 1 and of the second lens array 2 are in the present case formed on a substrate as a micro-cylindrical lens means. In other words, the two lens arrays 1, 2 are formed monolithically.

The device for homogenizing laser radiation 100 further includes a spherically formed Fourier lens means 5, which is arranged in the beam path behind the second lens array 2.

The laser radiation 100 which is emitted from a laser light source (not explicitly shown here) and collimated by at least one collimator means, is first incident on the first lens array 1. The collimated laser radiation 100, which may have for example an intensity profile in the form of a Gaussian profile, enters the first lens array 1 at the first optically functional boundary surface 10 and is after transmission split at the light exit surface 11 by the cylindrical lens means 3 into a number sub-beams 101, 102, 103 corresponding to the number of the cylindrical lens means 3. In order to not overly complicate the diagram and make it easier to comprehend, only three sub-beams 101, 102, 103 are intentionally shown in FIG. 1 behind the first lens array 1 in the beam propagation direction.

In the further beam path, the sub-beams 101, 102, 103 enter the second lens array 2 through the first optically functional boundary surface 20, pass through the second lens array 2 and are refracted a second time at the second optically functional boundary surface 21 by the cylindrical lens means 4 formed thereon. The Fourier lens means 5 arranged in the beam path behind the second lens array 2 is capable of superimposing the sub-beams 101, 102, 103 in the working plane 6, which is the focal plane of the Fourier lens means 5, so as to produce there a homogeneous (uniform) intensity distribution at least in one direction.

Figure 2:
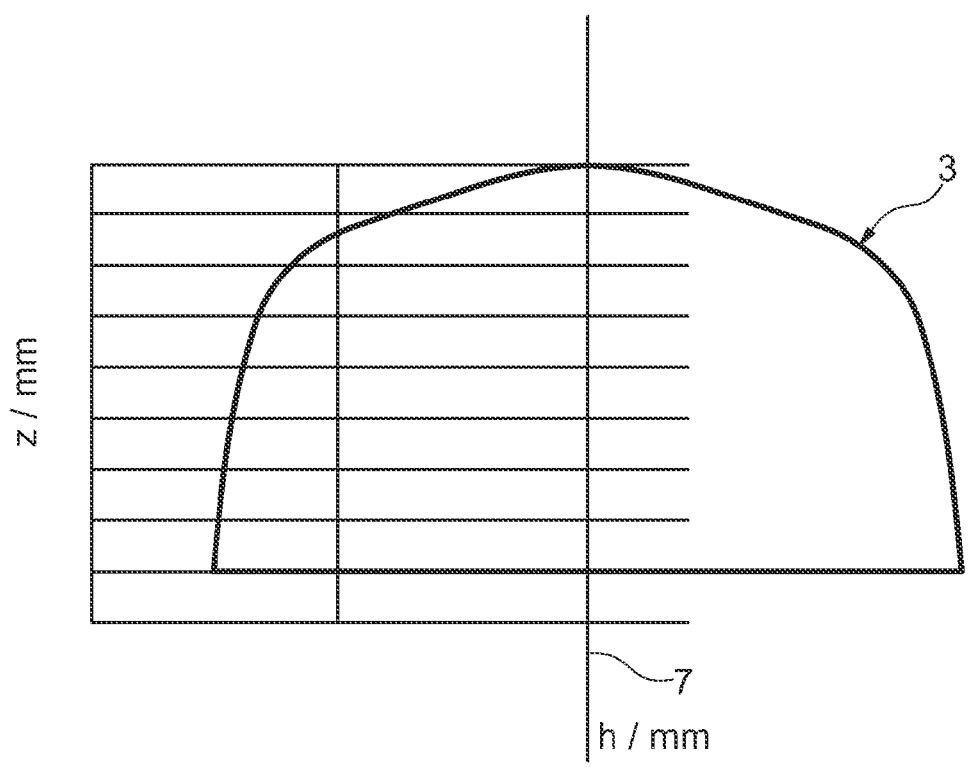

The cylindrical lens means 3 of the first lens array 1 are formed so as to split the laser radiation into a plurality of sub-beams 101, 102, 103 and to shape the sub-beams 101, 102, 103 so that the sub-beams 101, 102, 103 can illuminate the cylindrical lens means 4 of the second lens array 2 substantially homogenously. This is achieved by reducing the energy density (or intensity) of the sub-beams 101, 102, 103 at the individual cylindrical lens means 4 of the second lens array 2 so as to be always lower than the damage threshold of the optionally applied antireflection coating, thereby effectively preventing damage to the antireflection coating. To realize these illumination conditions for the second lens array 2 in a particularly simple manner, the cylindrical lens means 3 of the first lens array 1 have an aspheric cross-sectional profile, as viewed transversely to their respective cylinder axes. An exemplary cross-sectional profile of a cylindrical lens means 3 formed in this way is shown in FIG. 2. The aspherical shape of the cross-sectional profile can be clearly seen. Conversely, the cylindrical lens means 4 of the second lens array 2 have a spherical cross-sectional profile, as viewed perpendicular to their respective cylinder axes.

Optionally, the cross-sectional profiles of at least some of the cylindrical lens means 3 of the first lens array 1 may be symmetric with respect to symmetry plane 7 extending orthogonal to the cylinder axis of the respective cylindrical lens means 3. This situation is illustrated in FIG. 2. Preferably, the cross-sectional profiles of all the cylindrical lens means 3 of the first lens array 1 are symmetric with respect to a symmetry plane 7. Alternatively, the cross-sectional profiles of at least some of the cylindrical lens means 3 of the first lens array 1 may be shaped asymmetrically.

In the exemplary embodiment shown in FIG. 1, the cylindrical lens means 3 of the first lens array 1 have a focal distance $f_1$, while the cylindrical lens means 4 of the second lens array 2 have a focal length $f_2$, wherein the focal lengths are $f_1$, $f_2$ are selected such that $f_1 > f_2$. In an alternative embodiment, the focal lengths $f_1$, $f_2$ of the cylindrical lens means 3 of the first lens array 1 and the cylindrical lens means 4 of the second lens array 2 may also be selected such that $f_1 = f_2$. In another alternative embodiment, the focal lengths $f_1$, $f_2$ may be selected such that $f_1 < f_2$. It has been observed that different focal lengths $f_2$ can advantageously improve the illumination of the cylindrical lens means 4 of the second array 2. The first lens array 1 and the second lens array 2 can preferably be arranged at a distance d from each other which is selected so that $d = f_2$. This is strictly speaking true only when the lens apexes of the cylindrical lens means 3 of the first lens array 1 point exactly to the lens apexes of their associated cylindrical lens means 4 of the second lens array 2. Otherwise, the distance d would need to be corrected by T/n (T: lens thickness, n: refractive index). This length dimension must in each case be subtracted from $d = f_2$ when the apex of one of the cylindrical lens means 3 of the first lens array 1 points away from the associated cylindrical lens means 4 of the second lens array 2.

With the aforedescribed device for homogenizing the laser radiation 100, wherein the cross-sectional profiles of the cylindrical lens means 3 of the first lens array 1 are shaped aspheric, the maximum intensity incident on the second lens array 2 can be reduced to about 50% of the original maximum intensity.

In the aforedescribed exemplary embodiment, only the second optically functional boundary surfaces 11, 21 of the first and second lens arrays 1, 2, include a plurality of cylindrical lens means 3, 4. In principle, the first optically functional boundary surface 10 of the first lens array 1 may also include a number of juxtaposed cylindrical lens means having cylinder axes that are parallel to each other and perpendicular to the cylinder axes of the cylindrical lens means 3 on the second optically functional boundary surface 11. Preferably, the cylindrical lens means on the first optically functional boundary surface 10 of the first lens array 1 also have an aspheric cross-sectional profile. Furthermore, the first optically functional boundary surface 20 of the second lens array 2 may have a plurality of juxtaposed cylindrical lens means having cylinder axes that are parallel to each other and perpendicular to the cylinder axes of the cylindrical lens means 4 on the second optically functional boundary surface 21.

Preferably, the cylindrical lens means on the first optically functional boundary surface 20 of the second lens array 2 have also on a spherical cross-sectional profile.

According to an alternative embodiment (not explicitly shown here), the second lens array 2 may be formed so as to be able to superimpose the sub-beams 101, 102, 103 refracted by its lens means 4 in a working plane 6. The Fourier lens means 5 disposed behind the second lens array 2 in the beam propagation direction can be dispensed with in this variant, since the above-mentioned function of the Fourier lens means 5 is integrated in the second lens array 2.

In principle, the device for homogenizing laser radiation 100 may be designed entirely without Fourier lens means 5 and without integrating the Fourier lens function in the second lens array 2. A homogeneous angular distribution of the sub-beams 101, 102, 103 is achieved after the passage of the laser radiation 100 through the second lens array 2, which also produces a substantially homogeneous intensity distribution in the far field in a working plane that is sufficiently far removed from the second lens array 2.

The invention claimed is:

1. A device for homogenizing laser radiation (100), comprising:
   a first lens array (1) having a first optically functional boundary surface (10) through which the laser radiation (100), which has an intensity profile in form of a Gaussian profile, enters the first lens array (1), and a second optically functional boundary surface (11) through which the laser radiation (100) exits from the first lens array (1), wherein at least one of the two optically functional boundary surfaces (10, 11) comprises a plurality of lenses (3) splitting the laser radiation (100) into a plurality of sub-beams (101, 102, 103), as well as
   a second lens array (2), which is arranged in a beam path behind the first lens array (1), with a first optically functional boundary surface (20), through which the sub-beams (101, 102, 103) enter the second lens array (2), and with a second optically functional boundary surface (21), through which the sub-beams (101, 102, 103) exit the second lens array (2), wherein at least one of the first and second optically functional boundary surfaces (20, 21) of the second lens array (2) comprises a plurality of lens (4) configured to refract the sub-beams (101, 102, 103),
wherein the plurality of lenses (3) of the first lens array (1) are designed to split the laser radiation (100) into the plurality of sub-beams (101, 102, 103) in such a way to illuminate the plurality of lenses (4) of the second lens array (2) substantially homogeneously, wherein cross-sectional profiles transverse to axes of the first lens array (1) of at least some of the plurality of lenses (3) of the first lens array (1) are shaped aspherically or acylindrically,
wherein the plurality of lenses (3) of the first lens array (1) are cylindrical lenses (3), whose cylinder axes extend parallel to each other in a first direction and split the laser radiation (100) into the plurality of sub-beams (101, 102, 103), and/or
the plurality of lenses (4) of the second lens array (2) are cylindrical lenses (4), whose cylinder axes extend parallel to each other in the first direction and refract the plurality of sub-beams (101, 102, 103),
wherein the cross-sectional profiles of at least some of the cylindrical lenses (3) of the first lens array (1) are designed asymmetrically.

2. The device according to claim 1, wherein the cross-sectional profiles transverse to the axes of the first lens array (1) of all the plurality of lenses (3) of the first lens array (1) are shaped aspherically or acylindrically.

3. The device according to claim 1, wherein the plurality of lenses (3) of the first lens array (1) have a focal length $f_1$, and the lenses (4) of the second lens array (2) have a focal length $f_2$, wherein the focal lengths are selected such that $f_1 = f_2$.

4. The device according to claim 1, wherein the plurality of lenses (3) of the first lens array (1) have a focal length $f_1$, and the plurality of lenses (4) of the second lens array (2) have a focal length $f_2$, wherein the focal lengths are selected such that $f_1 > f_2$.

5. The device according to claim 1, wherein the plurality of lenses (3) of the first lens array (1) have a focal length $f_1$, and the plurality of lenses (4) of the second lens array (2) have a focal length $f_2$, wherein the focal lengths are selected such that $f_1 < f_2$.

6. The device according to claim 4, wherein the first lens array (1) and the second lens array (2) are arranged at a distance d to each other, wherein the distance d is chosen so that $d = f_2$.

7. The device according to claim 1, wherein the plurality of lenses (3, 4) of the first lens array (1) and/or the second lens array (2) are formed as micro lenses.

8. The device according to claim 1, wherein the device comprises a Fourier lens (5), which is designed and arranged in the beam path behind the second lens array (2) so as to superimpose the sub-beams (101, 102, 103) refracted by the plurality of lenses (4) of the second lens array (2) in a working plane (6).

9. The device according to claim 1, wherein at least some of the cylindrical lenses (3) of the first lens array (1) have an aspheric cross-sectional profile when viewed transversely to their respective cylinder axes.

10. The device according to claim 9, wherein all the cylindrical lenses (3) of the first lens array (1) have an aspheric cross-sectional profile when viewed transversely to their respective cylinder axes.

11. The device according to claim 9, wherein the plurality of cylindrical lenses (4) of the second lens array (2) have a spherical cross-sectional profile when view perpendicular to their respective cylinder axes.

* * * * *